(12) United States Patent
Nagao et al.

(10) Patent No.: US 8,881,413 B2
(45) Date of Patent: Nov. 11, 2014

(54) STAFF FOR ELECTRONIC LEVEL

(75) Inventors: Takashi Nagao, Tokyo-to (JP);
Tatsuyuki Matsumoto, Tokyo-to (JP);
Naoki Shoji, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 96 days.

(21) Appl. No.: 13/537,410

(22) Filed: Jun. 29, 2012

(65) Prior Publication Data
US 2013/0008038 A1 Jan. 10, 2013

(30) Foreign Application Priority Data

Jul. 4, 2011 (JP) ................................. 2011-148281

(51) Int. Cl.
*G01C 9/06* (2006.01)
*G01C 15/06* (2006.01)
*G01C 5/00* (2006.01)

(52) U.S. Cl.
CPC . *G01C 15/06* (2013.01); *G01C 5/00* (2013.01)
USPC ........................................................ 33/293

(58) Field of Classification Search
USPC .................................................. 33/293, 771
See application file for complete search history.

(56) References Cited

U.S. PATENT DOCUMENTS

| | | | |
|---|---|---|---|
| 2,909,839 A | 10/1959 | Miller | |
| 3,727,219 A | 4/1973 | Graham | |
| 4,023,908 A | 5/1977 | Johnson et al. | |
| 4,715,714 A * | 12/1987 | Gaechter et al. | 356/617 |
| 5,537,200 A | 7/1996 | Kumagai et al. | |
| 5,539,993 A * | 7/1996 | Kilpinen et al. | 33/706 |
| 5,777,899 A | 7/1998 | Kumagai | |
| 5,887,354 A * | 3/1999 | Nagao | 33/293 |
| 6,167,629 B1 | 1/2001 | Chiba | |
| 6,573,981 B2 | 6/2003 | Kumagai et al. | |
| 7,644,505 B2 * | 1/2010 | Zeng et al. | 33/293 |
| 8,510,964 B2 * | 8/2013 | Nagao | 33/293 |
| 2005/0236487 A1 | 10/2005 | Kaner | |
| 2007/0017111 A1 * | 1/2007 | Hoback et al. | 33/771 |
| 2007/0289152 A1 * | 12/2007 | Zeng et al. | 33/293 |
| 2013/0269195 A1 | 10/2013 | Matsumoto et al. | |

FOREIGN PATENT DOCUMENTS

| | | |
|---|---|---|
| EP | 1593935 A1 | 11/2005 |
| JP | 6-241791 A | 9/1994 |
| JP | 7-4959 A | 1/1995 |
| JP | 11-183164 A | 7/1999 |
| JP | 2000-266540 A | 9/2000 |
| JP | 2007-536538 A | 12/2007 |
| WO | 2005/108922 A2 | 11/2005 |
| WO | 2012/035835 A1 | 3/2012 |

OTHER PUBLICATIONS

Extended European Search Report dated Oct. 25, 2012 in corresponding European patent application No. EP 12174554.1.

* cited by examiner

*Primary Examiner* — Yaritza Guadalupe-McCall
(74) *Attorney, Agent, or Firm* — Nields, Lemack & Frame, LLC

(57) ABSTRACT

A staff for electronic level comprises a substrate where a short-range barcode 14 is engraved, and in the staff for electronic level, said short-range barcode is a barcode obtained by scaling down a barcode 13 for regular measurement and reversing the monochrome.

6 Claims, 5 Drawing Sheets

STAFF FOR ELECTRONIC LEVEL

BACKGROUND OF THE INVENTION

The present invention relates to a staff for electronic level used for an electronic level.

As a conventional staff for electronic level, there has been known a staff for electronic level in which a barcode is formed on a surface of a rod-like elongated member whose cross section is a rectangle along a longitudinal direction at predetermined pitches in a predetermined pattern.

As the barcode, bars (black portions) extending in horizontal direction are engraved in the longitudinal direction at the predetermined pitches, widths (dimensions in up-and-down direction) of the bars change in a predetermined relationship. By detecting a change in width, it is possible to convert the pattern of the bars into a frequency, and further, by detecting a phase of the frequency, it is possible to measure a height.

Alternatively, as another barcode, bars having a plurality of types, e.g., seven types of different widths are engraved at equal pitches in a random pattern (so as to avoid the overlapping patterns), and by confirming the pattern, it is possible to measure a height.

In the staff for electronic level described above, in order to enable measuring a height at long range, a size of the pattern, a length of the staff for electronic level, and others are set. Therefore, the length of the staff for electronic level is as long as 3 m to 5 m, and the staff for electronic level is troublesome in terms of the carriage or the handling, e.g., a size or a weight.

Further, although there is an extensible staff for electronic level, it cannot be the that the convenience has been greatly improved in regard to a size, a weight, and others.

Furthermore, since a view angle of the electron level is not large, in the measurement at short range, only a part of the pattern of the barcode can be visually confirmed, and the workability of the measurement is deteriorated.

SUMMARY OF THE INVENTION

It is an object of the present invention to improve portability of the staff for electronic level and also to improve the convenience of the carriage and the handling.

To attain the above object, a staff for electronic level according to the present invention comprises a substrate where a short-range barcode is engraved, and in the staff for electronic level, the short-range barcode is a barcode obtained by scaling down a barcode for regular measurement and reversing the monochrome.

Further, in the staff for electronic level according to the present invention, the substrate is a strip-like thin steel sheet of a convex.

Further, in the staff for electronic level according to the present invention, the substrate is a strip-like plate material.

Further, in the staff for electronic level according to the present invention, gradations for length measurement are engraved in one surface of the substrate, and the short-range barcode is engraved in the other surface, and the barcode for regular measurement is engraved in one surface of the substrate, and the short-range barcode is engraved in the other surface.

Furthermore, in the staff for electronic level according to the present invention, a circular bubble tube is provided in a container of the convex.

According to the present invention, the staff for electronic level comprises a substrate where a short-range barcode is engraved, and in the staff for electronic level, the short-range barcode is a barcode obtained by scaling down a barcode for regular measurement and reversing the monochrome. As a result, the short-range measurement can be performed smoothly, the staff for electronic level can be miniaturized, and the convenience of the carriage and the handling of the staff for electronic level can be improved.

Further, according to the present invention, in the staff for electronic level, the substrate is a strip-like thin steel sheet of a convex. As a result, the substrate can be compactly accommodated when not used, the size and the weight can be reduced, and the convenience of the carriage and the handling can be further improved.

Further, according to the present invention, in the staff for electronic level, gradations for length measurement are engraved in one surface of the substrate, and the short-range barcode is engraved in the other surface. As a result, the height measurement as well as the simple length measurement can be performed.

Further, according to the present invention, in the staff for electronic level, the barcode for regular measurement is engraved in one surface of the substrate, and the short-range barcode is engraved in the other surface. As a result, the reduction in size and weight can be achieved, and the measurement at short range and long range can be carried out without deteriorating the convenience of the carriage and the handling.

Furthermore, according to the present invention, in the staff for electronic level, a circular bubble tube is provided in a container of the convex. As a result, when the convex is used as the staff for electronic level, the vertical state can be maintained, and the measurement accuracy can be improved.

BRIEF DESCRIPTION OF THE DRAWINGS

FIG. 5A is a front view of a state that a part of a scale is pulled out, FIG. 5B is a plan view of the pulled-out scale, FIG. 5C is a bottom view of the pulled-out scale, FIG. 5D shows a cross section of the scale and FIG. 5D is an arrow diagram taken along A-A in FIG. 5B.

DETAILED DESCRIPTION OF THE PREFERRED EMBODIMENTS

By referring to the attached drawings, description will be given below on an embodiment according to the present invention.

Figure 1:
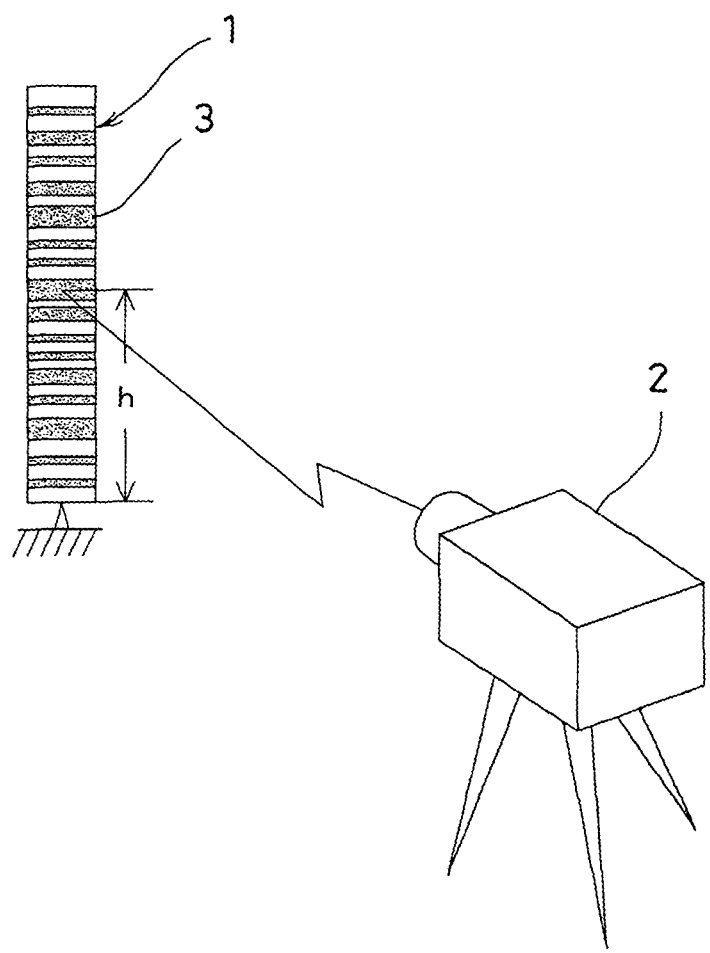
FIG. 1 is a schematical explanatory drawing showing the measurement by a staff for electronic level and an electronic level.

First, FIG. 1 shows the outline of the measurement in which a staff for electronic level according to the present invention is applied to.

A staff for electronic level (hereinafter referred as "a staff") 1 is erected at a measuring point, sighting of the staff 1 is performed by an electronic level 2, a barcode 3 printed or nicked (hereinafter referred as "engraved") in the staff 1 is read, and a height h at a sighting position is measured.

Figure 2:
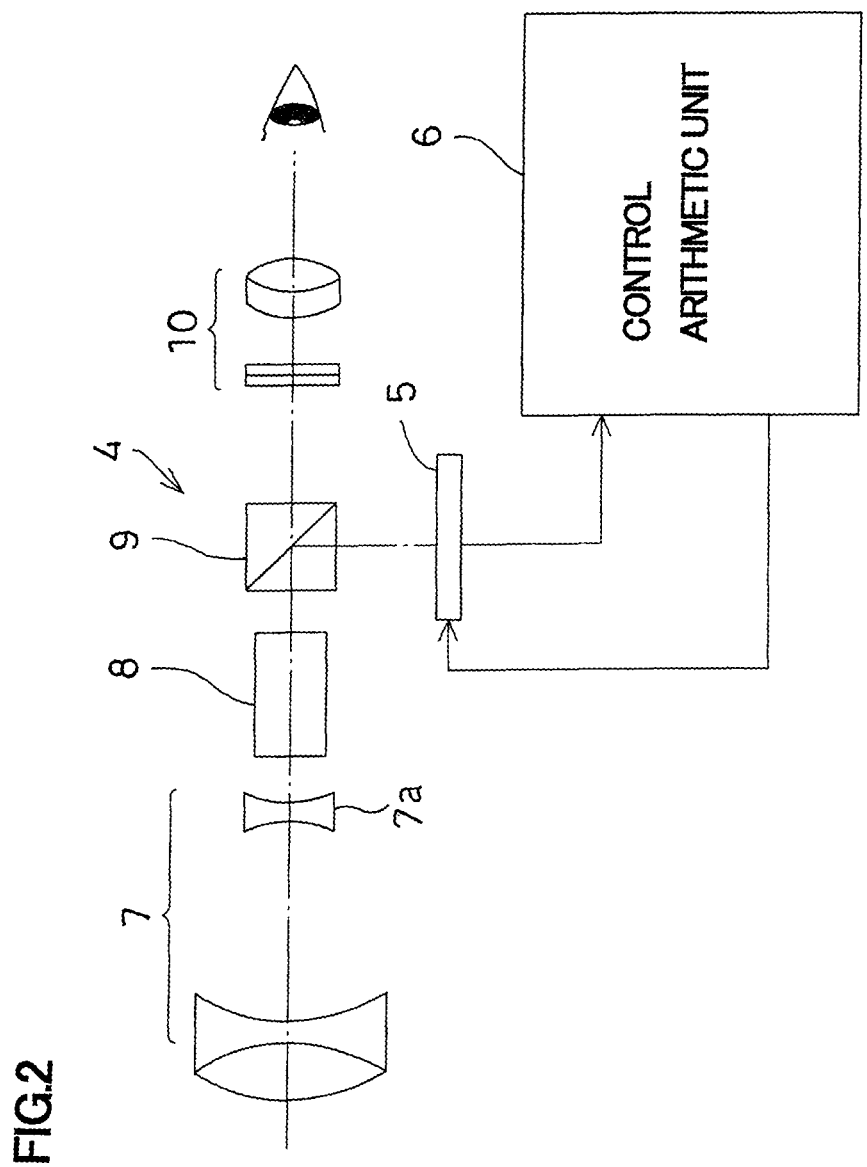
FIG. 2 is a schematical block diagram of the electronic level.

As shown in FIG. 2, the electronic level 2 has a sighting optical system 4, a line sensor 5, and a control arithmetic unit 6. Further, the sighting optical system 4 has an objective lens unit 7 including a focusing lens 7a, and also has a compensator 8 which is an automatic compensation mechanism for an optical axis, a beam splitter 9, and an ocular lens unit 10. The beam splitter 9 splits the reflected light from the staff 1 which enters the sighting optical system 4, and allows the line sensor 5 to receive a part of the reflected light.

The control arithmetic unit 6 captures a signal from the line sensor 5, controls the capture of the signal, processes the signal as captured, reads a pattern of the barcode 3, calculates a height of a sighting position, and further, calculates a distance to the staff 1 according to a size of an image of the pattern.

In regard to the staff 1, the barcode 3 is engraved in a straight substrate, and the several types of patterns of the barcode 3 engraved in the substrate are used.

For example, there is an example disclosed in Japanese Patent Application Publication No. H7-4959 and, as the patterns of the barcode disclosed in Japanese Patent Application Publication No. H7-4959, two types of patterns of the barcode formed at the same pitch are engraved, and in one of two patterns widths of bars is changed with a first cycle and in another pattern widths of bar is changed with a second cycle different from a first cycle.

By processing the signal from the line sensor 5, the control arithmetic unit 6 detects the first cycle and the second cycle from each pattern, and calculates the height of the sighting position from a phase difference between the first cycle and the second cycle. Further, the control arithmetic unit 6 calculates a distance to the staff for electronic level 1 from a size of an image on the line sensor 5 (e.g., an interval between the bars), from an actual dimension of the interval between the bars, and from a focal length of the electronic level 2.

Furthermore, as a pattern of a barcode disclosed in Japanese Patent Application Publication No. H11-183164, a plurality of types of bars having the different widths are regarded as one set, the necessary number of sets are engraved in such a manner that all the sets have the different bar arrangements. The control arithmetic unit 6 reads a barcode, also reads the bar arrangement, confirms which set the bar and the arrangement belong to, identifies a set of the arrangement, identifies a position in the bar arrangement. As a result, the control arithmetic unit 6 calculates the height of the sighting position.

In any case, the staff 1 has a length so as to enable measuring a predetermined distance and a size, a width, and an interval of each bar so as to enable detecting the barcode and the pattern even at long range. Therefore, as described above, the staff 1 has a length of 3 m to 5 m, and the staff 1 is large and heavy. Moreover, although some of the staffs are foldable or extensible, the convenience is yet to be improved.

Additionally, when the staff 1 which can measure a long range is used for the measurement of a short range, since a field angle of the sighting optical system 4 is not large, the number of bars 3a which can be placed in a field of view 4a is limited, the bars corresponding to one cycle or a pattern of the bars corresponding to one set cannot be completely placed in some cases.

Figure 3:
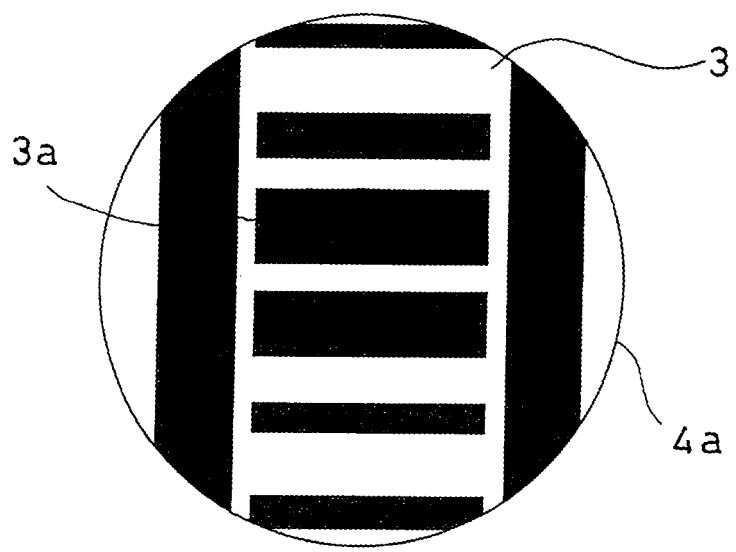
FIG. 3 is an explanatory drawing showing a relationship between a barcode engraved in the staff for electronic level and a field of view of the electronic level.

For example, like FIG. 3, as a case where only some of the bars 3a constituting the pattern can be acquired as an image, there are a case where the measurement cannot be smoothly performed or a case where the measurement is difficult.

Figure 4A:
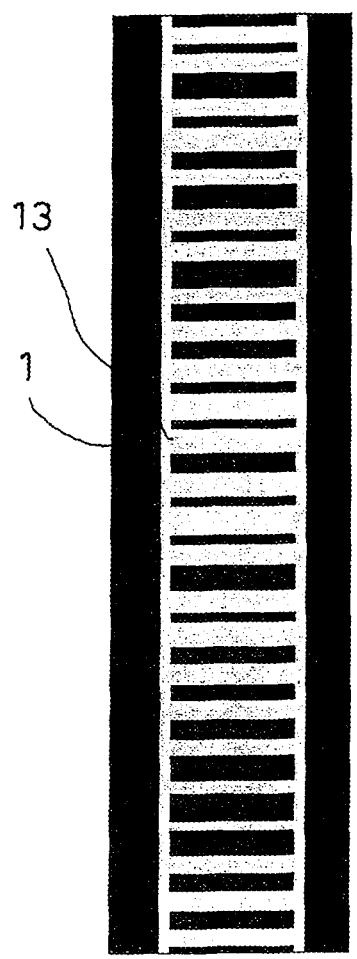
FIG. 4A is a drawing showing a regular barcode engraved in the staff for electronic level.
Figure 4B:
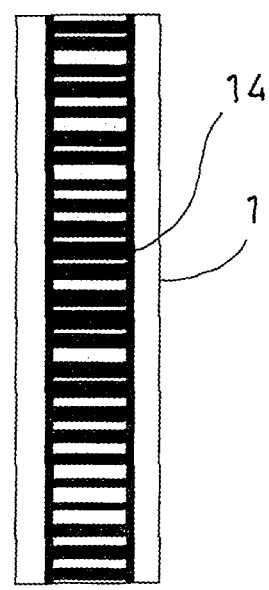
FIG. 4B is a drawing showing a short-range barcode engraved in the staff for electronic level.
Figure 5A:
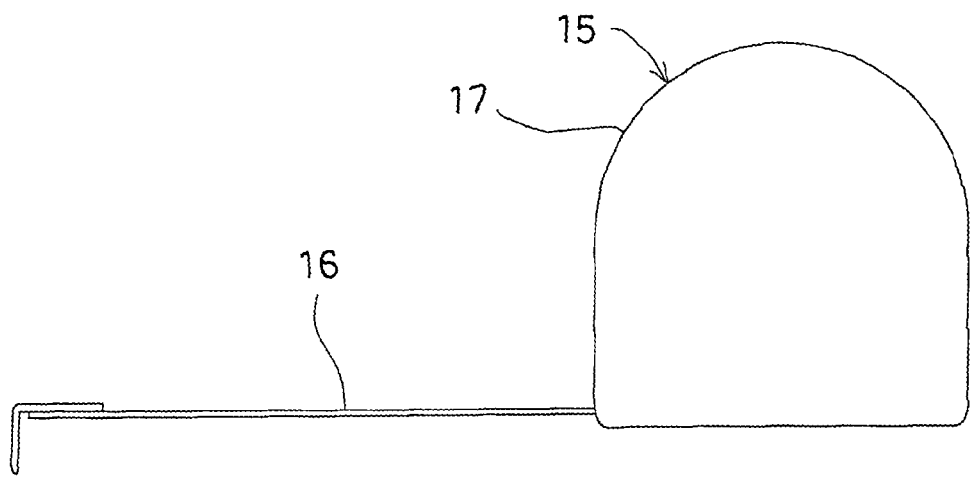
FIG. 5A, FIG. 5B, FIG. 5C, and FIG. 5D are drawings when the present invention is applied to a convex, where
Figure 5B:
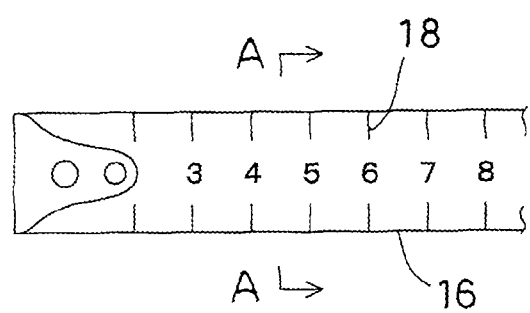
Figure 5C:
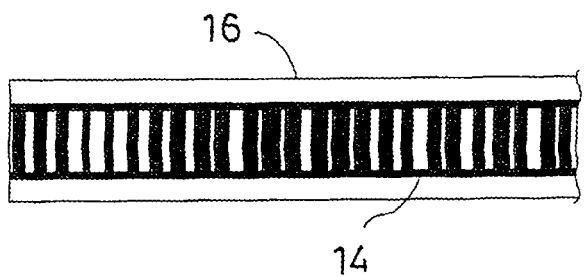
Figure 5D:
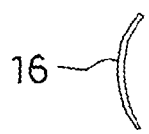

Therefore, in the present embodiment, a barcode for a short range is prepared and engraved in the staff 1. FIG. 4A shows a regular barcode 13, and FIG. 4B shows a short-range barcode 14. It is to be noted that the short-range barcode 14 may be engraved in a staff 1' as additionally prepared, or may be engraved in the other surface of the staff 1 where the regular barcode 13 is engraved.

The short-range barcode 14 is a barcode which is obtained by scaling down the regular barcode 13 and by displaying in reverse the monochrome, and a scale ratio is, e.g., 50%. Therefore, if the regular barcode 13 is 5 m, the short-range barcode 14 is scaled down to 2.5 m.

By reversing the monochrome, it is possible to determine reliably that the barcode is the short-range barcode 14 from an image. Further, since the pattern is the same as the pattern of the regular barcode 13, it is possible to use the same arithmetic program for performing the measurement from the pattern as an arithmetic program for the regular barcode 13, and it is enough if an obtained result is simply corrected (converted) with the scale ratio. Therefore, the short-range barcode 14 can be likewise applied to an existing electronic level.

It is to be noted that, as the pattern of the barcode to be used, the patterns disclosed in Japanese Patent Application Publication No. H7-4959 and Japanese Patent Application Publication No. H11-183164 or any other arbitrary pattern can be used. Further, it is needless to say that the reduction scale is not restricted to 50% and can be appropriately set.

Therefore, when performing the short-range measurement, for example, in a foundation work at the time of the house construction, it is enough if the staff 1 having a length of approximately 2 m is used, and the carriage and the handling properties are considerably improved.

Next, by referring to FIG. 5, description will be given on the staff 1 having the further improved convenience, e.g., the carriage or the handling properties or the like.

FIG. 5 shows a case where the present invention is applied to a convex (a tape measure).

A convex 15 is a scale 16 for measuring the length, and the convex 15 winds up a strip-like thin steel sheet and accommodates the steel sheet in a case 17. Although the scale 16 itself is bendable, in a state that the scale 16 is pulled out, a transverse section of the scale 16 is curved, and it is configured so that a straight state of the pulled-out part can be maintained. Further, the scale 16 can be locked in the pulled-out state and, when the scale 16 is unlocked, the scale is wound up in the case 17 by a restorative operation of the scale 16 itself.

In case of the convex 15, the strip-like thin steel sheet is a substrate of the scale 16, gradations 18 for the distance measurement are engraved in one surface of the substrate, e.g., a concave curved surface, and the short-range barcode 14 is engraved in the other surface, e.g., a convex curved surface.

In the convex 15, by the gradations 18, the regular length measurement is possible and, when the scale 16 is pulled out and the short-range barcode 14 is set to face the electronic level 2 side and the convex 15 is maintained in an erected state, the convex 15 can be used as the staff 1 for short range.

In the height measurement in a foundation work or the like where the short-range barcode 14 is used, a high accuracy is not required, and it is enough if the convex 15 can be held in a state, which can be recognized by an operator as an erected state. Furthermore, in the height measurement in the foundation work or the like, a relative accuracy is required, and an absolute accuracy of the engraving of the short-range barcode 14 is not required. Therefore, an accuracy which the regular convex 15 has is sufficient.

It is to be noted that, in order to enable recognizing the erected state, a tilt detector such as a circular bubble tube or the like may be provided to the case 17.

Moreover, as the substrate of the scale 16, it is possible to adopt a staff-dedicated convex which has a width larger than a width of the substrate in the regular convex 15, e.g., a width of 30 mm to 40 mm, the regular barcode 13 is engraved in one surface, and the short-range barcode 14 is engraved in the other surface.

According to the present embodiment, in a state that the scale 16 is wound up, a size of the staff is a size of the case 17 alone, the scale 16 is compactly accommodated, and the carriage and the handling can be greatly facilitated. Additionally, the staff 1 itself is the thin steel sheet and down in weight is possible.

It is to be noted that, in the above-mentioned embodiment, although the short-range barcode 14 is engraved in one surface of the scale 16 of the convex 15, the short-range barcode 14 may be engraved in one surface of a strip-like plate material, e.g., one surface of a stainless ruler. Alternatively, the short-range barcode 14 may be engraved in one surface of a foldable ruler.

The invention claimed is:

1. A staff for electronic level, comprising a substrate where a short-range barcode is engraved, wherein said short-range barcode is a barcode obtained by scaling down a barcode for regular measurement and reversing the monochrome, and wherein said short-range barcode is the same pattern as said barcode for regular measurement.

2. The staff for electronic level according to claim 1, wherein said substrate is a strip-like thin steel sheet of a convex.

3. The staff for electronic level according to claim 1, wherein said substrate is a strip-like plate material.

4. The staff for electronic level according to claim 2 or 3, wherein gradations for length measurement are engraved in one surface of said substrate, and said short-range barcode is engraved in the other surface.

5. The staff for electronic level according to claim 2 or 3, wherein said barcode for regular measurement is engraved in one surface of said substrate, and said short-range barcode is engraved in the other surface.

6. The staff for electronic level according to claim 2, wherein a circular bubble tube is provided in a container of said convex.

* * * * *